(12) United States Patent
Ormazabal Ocerin

(10) Patent No.: US 6,976,862 B1
(45) Date of Patent: Dec. 20, 2005

(54) CELL UNION ASSEMBLY FOR ELECTRIC SWITCHGEAR

(75) Inventor: Francisco Javier Ormazabal Ocerin, Igorre (ES)

(73) Assignee: Ormazabal Y CIA, S.A., Igorre (ES)

( * ) Notice: Subject to any disclaimer, the term of this patent is extended or adjusted under 35 U.S.C. 154(b) by 0 days.

(21) Appl. No.: 10/415,027

(22) PCT Filed: Oct. 24, 2000

(86) PCT No.: PCT/ES00/00409

§ 371 (c)(1),
(2), (4) Date: Jan. 5, 2004

(87) PCT Pub. No.: WO02/35668

PCT Pub. Date: May 2, 2002

(51) Int. Cl.[7] ............................................. H01R 13/64
(52) U.S. Cl. ...................................... 439/246; 439/788
(58) Field of Search ................................ 439/246, 252, 439/821, 788

(56) References Cited

U.S. PATENT DOCUMENTS 3,713,075 A  1/1973  Clark ........................ 439/246

5,257,161 A  10/1993  Ocerin ........................ 361/605

FOREIGN PATENT DOCUMENTS

| AU | 728925 | 1/1999 |
|----|--------|--------|
| EP | 0 520 933 | 12/1992 |
| EP | 0 674 375 | 9/1995 |
| EP | 0 891 013 | 1/1999 |
| ES | 2 037 590 | 6/1993 |
| ES | 2 072 177 | 7/1995 |

*Primary Examiner*—Javaid H. Nasri
(74) *Attorney, Agent, or Firm*—Schiff Hardin LLP

(57) ABSTRACT

An independent connector element may be housed individually in pans which are coupled to modular cells that hold part of the operation and protection gear for transformation stations and electricity distribution. Each connector element may comprise an elastic and external mount, on the interior of which is fitted a conductive ring on which are axially arranged a plurality of semiconductor pieces passing through passages of the ring, these conductive parts forming a bundle with the facility to displace itself axially in the ring and with the facility to swivel in to make possible both its assembly and the coupling to the respective terminals (6) for connection provided in pans (7) that are mounted over the insulating mount (1) and that pertain to each of the adjacent cells.

7 Claims, 4 Drawing Sheets

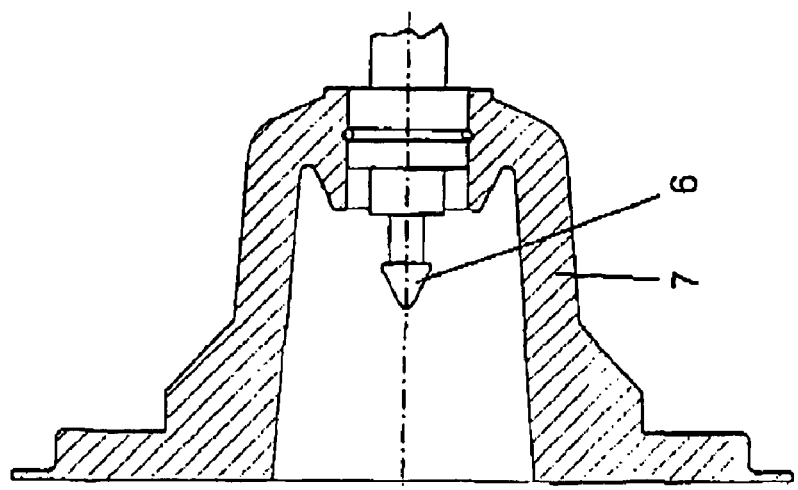
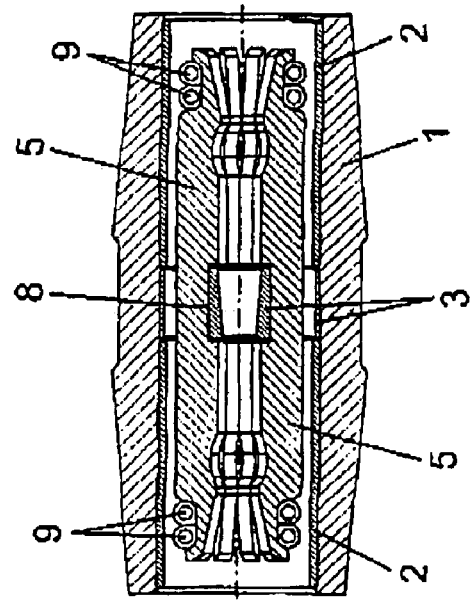
FIG. 2
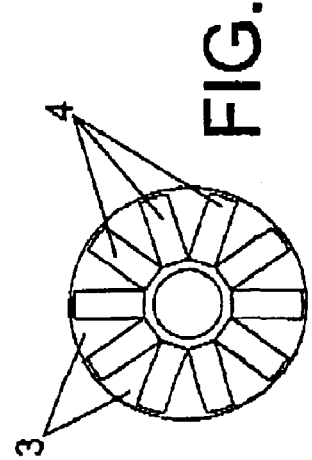
FIG. 3
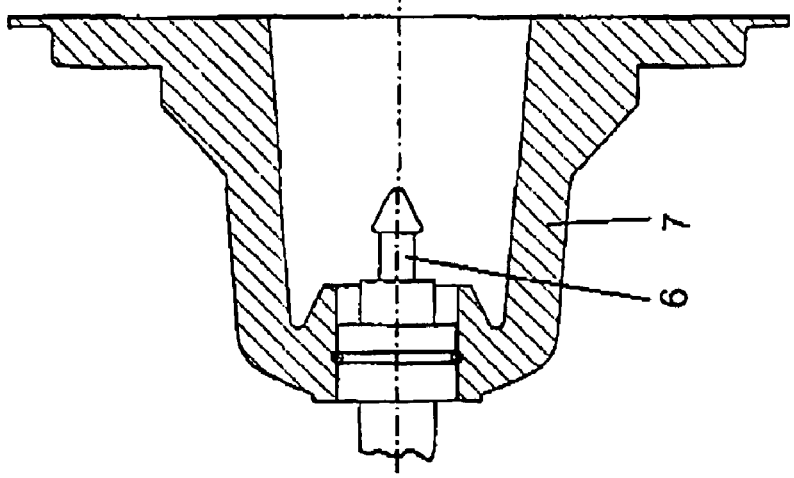

CELL UNION ASSEMBLY FOR ELECTRIC SWITCHGEAR

BACKGROUND OF THE INVENTION

1. Field of the Invention

The present invention relates to an interconnection assembly for electrical switchgear cells, and more specifically, to a system for coupling electrical switchgear cells or modules that can be used in electrical distribution and transformation centers. The assembly employs, in the coupling or interconnection between the cells, an independent connector element which is housed by plugging in (as an intermediate piece) into individual pans provided for this purpose in each one of the cells equipped with conductor terminals to be joined.

2. Description of the Related Art

European Patent No. 0520933 describes a coupling system for coupling switchgear modules for transformation centers and the like, based on each of the modules or cells having holes into which fit respective pans forming a gastight coupling, with the collaboration of a sealing gasket, each pan coming equipped (in its small or internal base) with a hole comprising a fixed contact terminal.

Moreover, this patent describes how with each pair of pans opposite each other and corresponding to two adjacent modules, an insulating mount collaborates, as an intermediate coupling piece, having a shape of a bi-truncated cone and which is materialized by an external insulating mount, on the entire inside. The inside has a metallic tube which runs the full length longitudinally and inside which are housed a plurality of conductive parts, in the form of fingers, intended for coupling in the appendices that constitute the contact terminals of each cell. These pieces or fingers tend to close over the contact terminals via springs or coils on the periphery.

A series of elastic bands are arranged between the conductive parts and the metallic tube on the inside of the external insulating mount that permit a certain lateral mobility of those conductive parts in order to take up possible errors of alignment between the contact terminals, either through off-centering of the pans and even of the cells that are to be coupled.

DESCRIPTION OF THE INVENTION

By employing as a basis the coupling system referred to in this European Patent, the object of the invention is to provide a coupling system or interconnection assembly between cells which incorporate parts of the operation and protection gear of electrical distribution and transformation stations, where the actual coupling or interconnection is carried out in such a manner that it is managed at all times to maintain the impermeability of the coupling, both mechanically and electrically, thereby preventing the protective gas that this type of gear normally incorporates from escaping in the interconnection or coupling operation.

The interconnection assembly for electrical switchgear cells that is provided in an embodiment includes having the conductive parts be mounted in radial passages designed for this purpose in a conductor ring, the outside diameter of which corresponds with the inside diameter of the actual external and insulating mount. The packet of conductive parts may be secured on the inside of the insulating mount by virtue of the contact between the conductive ring and the mount itself, but with the possibility of tilting with respect to this in order that the packet of conductive parts may be displaced radially to couple over the contact terminals provided on the interior of the pans, even when they are out of alignment.

The conductive parts come with a central recess, determining a length of less width than that of the passage of the ring in which is housed each conductive part. This permits a radial displacement of the latter on the inside of the ring when the connector assembly is coupled over the corresponding terminal. The conductive parts may be pressed against the ring with the collaboration of some wrap-around springs, preventing, in this position, any displacement in a longitudinal direction that could permit the extraction of those conductive parts.

DESCRIPTION OF THE DRAWINGS

In order to complete the description being made and with the aim of assisting in a better understanding of the characteristics of the invention, according to a preferential example of practical embodiment thereof, a set of drawing is attached as an integral part of the description, in which drawings, by way of illustration and not restrictively, the following is shown:

FIG. 2 is a longitudinal cross section view of the same assembly of the connector element, as well as a section in side elevation of the two pans to be joined, with their pertinent contact terminals;

FIG. 3 is a frontal view of the conductive ring in which are fitted the semiconductor pieces situated coaxially on the inside of the external and elastic mount;

DETAILED DESCRIPTION OF THE PREFERRED EMBODIMENTS

Figure 1:
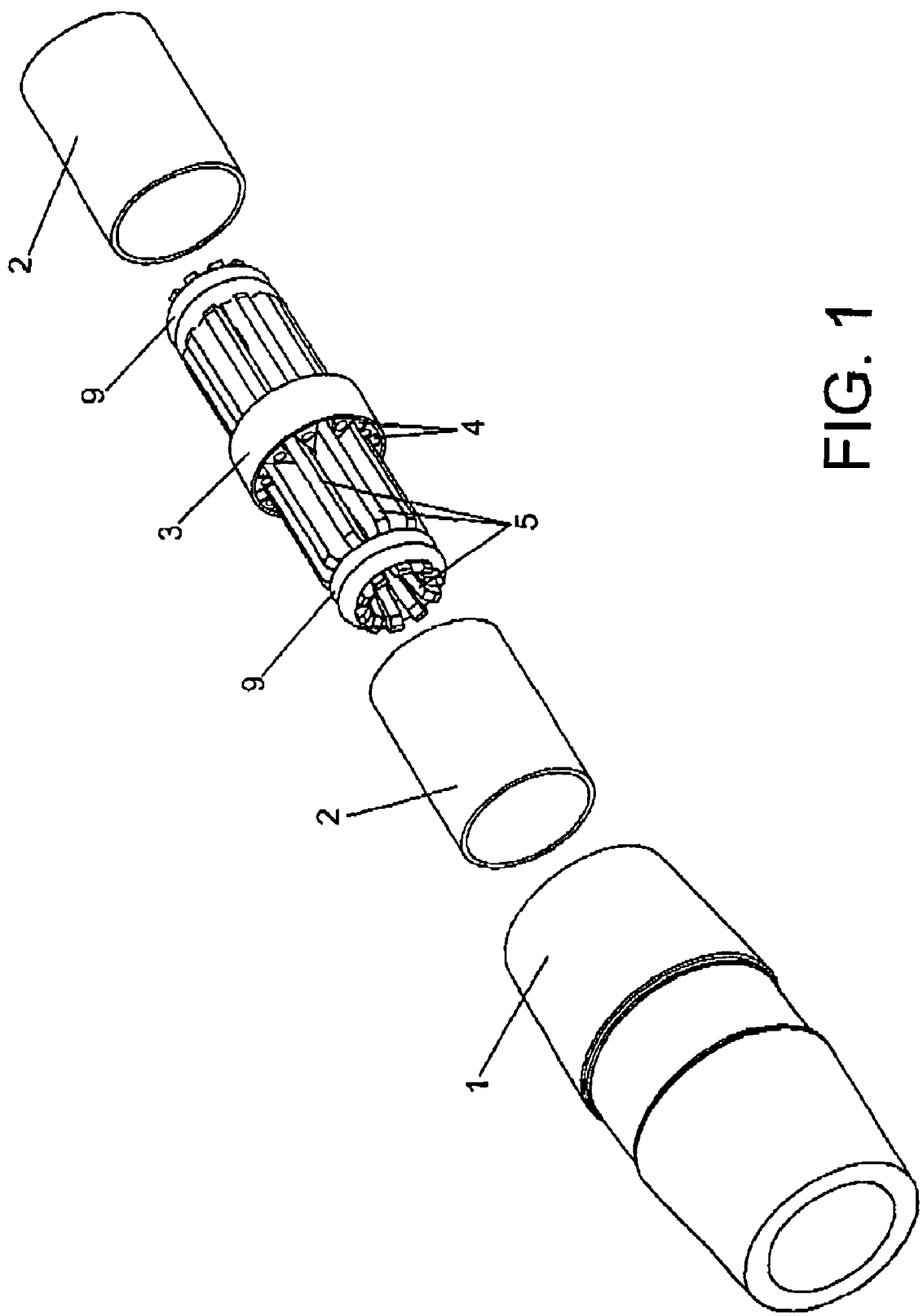
FIG. 1 is an exploded perspective view of the assembly that forms the independent connector element, each intended to be housed in a corresponding pan, the connector element being provided with a coupler/interconnector.
Figure 4:
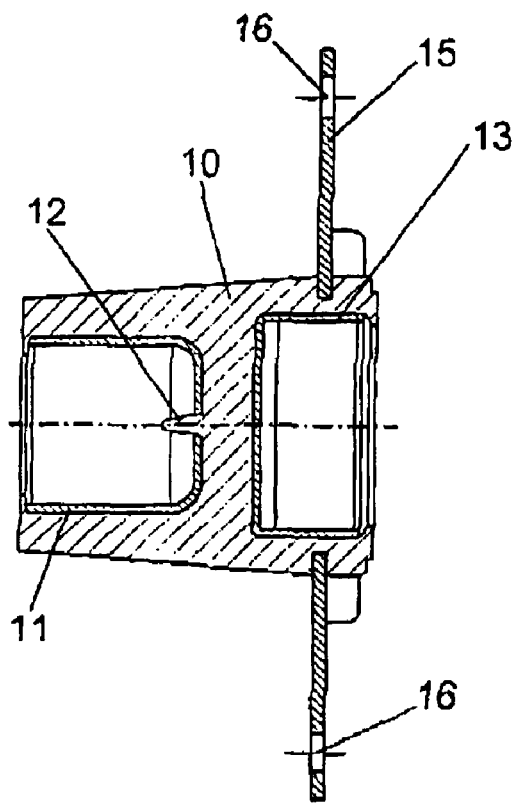
FIG. 4 is a sectional view of the cap foreseen for mounting on a pan.

An embodiment of the invention is directed to an interconnection assembly for electrical switchgear cells, applicable to modular cells that incorporate parts of operation and protection equipment of electrical distribution and transformation stations, comprising an independent connector element housed in each pan, previously coupled to the cells, in correspondence with conductor terminals to be joined and permitting offsetting of misalignments between conductor terminals, the pans permitting an attachable cap when an electrical connection is not required, an electrical isolation of the terminal situated in a bottom of the cap itself being formed, providing a leakproof coupling both mechanically and electrically, of the independent connector element to the conductive terminal of the pan, the independent connector element comprising: an external mount of elastic material provided internally and partially on the outside with a semiconductor to assure good control of the electric field; a pair of metallic tubes of a total length less than that of the external and elastic mount, arranged internally in the mount and approximately in correspondence with its outermost sectors, in order to leave a central zone of the external and elastic mount free; a metallic ring and conductor housed directly in an interior of the elastic mount; a bundle of conductive parts mounted axially in respective passages provided radially in the metallic ring, the conductive ring being in correspondence with the central zone, intercalated between facing ends of the metallic tubes, and fitting tightly between the ring and the mount, the conductive parts being spaced sufficiently from the metallic tubes to permit a degree of swiveling of the bundle formed by those conductive parts in order to offset possible misalignments between the conductive terminals to be connected.

In an embodiment, the conductive parts may comprise a central recess in which an area of the recess, its height is less than that offered by holes or passages of the conductive ring and, as a consequence, a free space is left between the conductive parts and the internal surface of the tubes that permits a radial displacement of those conductive parts in the interior of the conductive ring when the connector is coupled over a pertinent conductive terminal and even a swiveling of the conductive parts, in the interior of the mount when the terminals are not in alignment.

An embodiment may further comprise springs mounted over outermost sectors of the conductive parts on a periphery that press the bundle of conductive parts against the conductive ring which, together with recesses in the conductive parts, impede a displacement in a longitudinal direction and the corresponding extraction of the conductive parts.

An embodiment may further comprise a cap provided for fitting on the pans when an electrical connection is not necessary, the cap comprising an external and insulating support of elastic material, internal and external surfaces comprising semiconductor material to assure a good control of the electric field, and an internal and metallic socket which provides a certain stiffness that assures, in combination with an inherent elasticity of the body of the cap, good impermeability; the metallic socket contributing to the creation of an equipotential space in an interior of the cap, the socket having a hole in its bottom through which passes a small protuberance of flexible, semiconductor material, that comes into contact with the corresponding terminal of the cell, putting the socket and all that is contained therein at the same potential as the terminal and assuring a good contact with the corresponding terminal.

In an embodiment, the cap may further comprise, on its external part, a second metallic socket which, together with the internal socket, creates a capacitive divider permitting a probe to be connected to measure a voltage on an associated bar via a metallic tab corresponding to the external socket; and a flat metallic plate with holes for securing the plate to a pertinent cell, ensuring a sealed position on the cell.

An embodiment may include a three-phase metallic plate that joins three pans of a same cell, the plate being embedded in the pans themselves, the metallic plate comprising a slight elbow in order to redirect an electric field through the interior of the actual pan, the three-phase metallic plate being joined to the pans at the time when these pans are in a molding process.

In an embodiment of the invention, the external insulating mount of the connector assembly may be formed by an elastic material that possesses a great capacity for deformation permitting it to adapt to the respective pans, even though these are offset with regard to their position, thus guaranteeing an optimal mechanical seal between the connector and the pans of the cells.

The inside of the elastic mount, may be completed with two metallic tubes that are arranged at each of the extremities of the mount in order to provide the mount with a certain stiffness that ensures a good seal against the pans, internal tubes which have a length less than that of the mount in order to leave free the central sector thereof in which the conductive ring that supports the conductive parts is fitted. These metallic and internal stiffening tubes of the elastic mount can prevent a possible very high misalignment (between the elastic mount and the pans) from producing an excessive deformation of the mount that would entail an incorrect adjustment on the pertinent pan surface, which could create points without contact between the pan and the mount and thus a poor sealing action.

An embodiment of the invention concerns the cap which is coupled to the pans when there is no requirement or necessity for an electric connection; the cap may be provided in order to seal the pan hermetically and electrically isolate the contact situated on the bottom thereof.

The cap permits a good mechanical and electrical seal, for which reason a configuration similar to that of the connector has been foreseen, that is, with an insulating mount of elastic material and an internal metallic socket. This socket may establish the electrical contact and provide a certain stiffness which, when combined with the elasticity of the external mount, ensure a good seal.

In addition, the aforementioned metallic socket contributes to the creation of an equipotential space on the inside of the cap itself, which prevents partial discharges. A hole may be provided on the bottom of the socket through which projects a small protuberance of semiconductor material that comes into contact with the terminal of the respective cell, putting the socket and all the air held inside at the same potential as the connection terminal. This protuberance is provided with a certain flexibility in order to absorb possible variations in length and ensure good electrical contact.

The cap may be completed with a second metallic socket which, together with the internal socket, constitutes a capacitive divider, so that it is possible to connect a probe to measure the voltage on the bar via a metallic tab of the external socket.

An embodiment comprises three pans of a given cell that are joined by a three-phase metallic plate that acts as a screen, re-conducting the field through the pans and thereby avoiding the field concentration on the rims, the three-phase plate that is embedded in the pans may be slightly elbowed which redirects the electric field through the inside of the pan. This plate can make a redistribution of the electric field on the inside of the pan possible; it may be joined to the three pans of a cell in the actual process of cell molding, and may be secured to the cell by welding over the length of its periphery.

The embodiments may be further described from the aforementioned figures, each independent connector element, as is shown in FIGS. 1 and 2, may comprise, for its coupling to two contiguous pans, an elastic and insulating mount 1 in the shape of a bi-truncated cone, made of elastic material, which internally may be completed with a pair of metallic tubes 2. The total length of the independent connector elements (summing the length of both) may be less than that of the mount 1 itself, leaving an intermediate zone for fitting a conductive ring 3 in which a plurality of radial passages 4 are provided. Each passage may house a conductive part 5 in the form of a finger.

The outside diameter of the conductive ring 3 can be equal to the inside diameter of the elastic mount 1, the ring 3 being snugly fitted on the inside of the mount 1 in its central area and intercalated between the facing ends of the metallic tubes 2 situated on the inside of the elastic mount 1. The packet formed by the different conductive parts 5 housed and positioned in the passages 4 of the conductive ring 3 may be firmly held on the inside of the actual elastic mount 1 by virtue precisely of the contact between the ring 3 and the inside surface of the mount 1, but with the facility for the conductive parts 5 to swivel with respect to the mount 1 in order that the assembly of these may be displaced radially and be coupled on the conductive terminals 6 situated on the inside of the corresponding pans 7, even when these are misaligned.

Those conductive parts 5 may be provided with a central recess 8 which determines a loose-fitting housing for each of the conductive parts 5 in the corresponding passage 4 of the conductive ring 3. This permits the radial displacement of those conductive parts 5 when the connector assembly is coupled on the corresponding terminals and even a tilting of the parts when the terminals are found to be misaligned.

When the conductive parts 5 are situated in their correct position, in the ring 3, and the pertinent springs 9 may be mounted in an enveloping or perimetral manner on the end parts of those semiconductor pieces 5, these are left pressing tightly against the ring 3, and any displacement in the longitudinal direction is impossible, thereby preventing their extraction.

The metallic tubes 2, which the elastic mount 1 incorporates internally, may provide a certain stiffness that assures a good seal against the pans 7.

Figure 5:
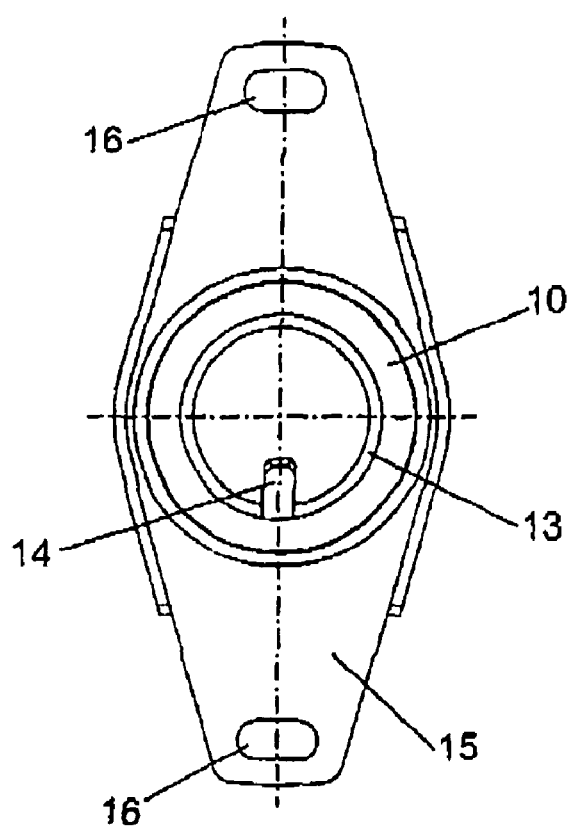
FIG. 5 is a frontal view of the assembly represented in the preceding FIG. 4.
Figure 6:
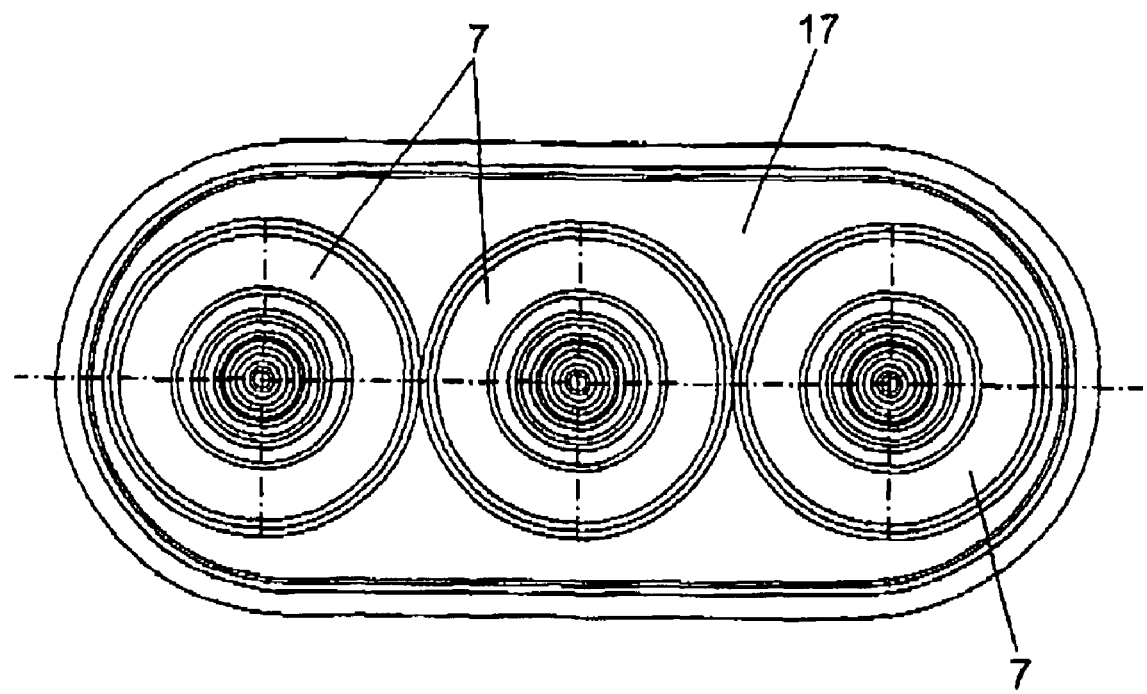
FIG. 6 is a plan view of the three pans of a single cell joined by a three-phase metallic plate.
Figure 7:
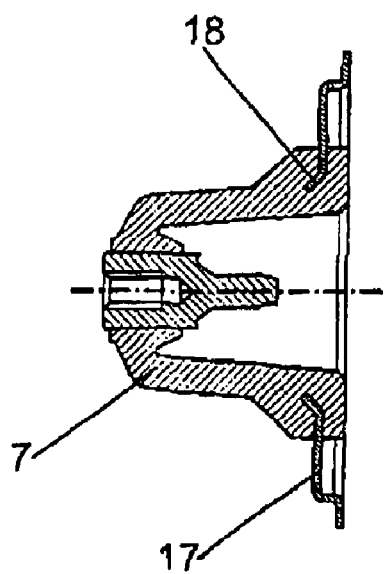
FIG. 7 is a transverse sectional view of the three-phase metallic plate of FIG. 6, with the pertinent pan.

With regard to the cap 10 shown in the FIGS. 5 and 6, provided to fit into the pans 7 when the electrical connection is not necessary, the cap closing the pan hermetically and electrically isolating the contact located on the bottom thereof, in order to achieve a good mechanical and electrical seal, the cap 10, may have a configuration similar to that of the connector previously described, that is, an isolating mount 10, also elastic in nature. The cap 10 may be fitted internally with a metallic socket 11 permitting contact to be established and also facilitating a certain stiffness which, in combination with the elasticity of the external mount corresponding to the body of the cap 10, assure a good seal.

In the bottom of the socket 11, a hole may be provided through which a small protuberance 12 passes The protuberance 12 may be made of a semiconductor material, and, when it comes into contact with the terminal 6 of the cell, may put the socket 11 and all the air contained inside it at the same potential as the terminal. This protuberance 12 may be made of a flexible material in order to absorb possible variations in length and assure a good contact with the corresponding terminal.

Furthermore, the cap 10 may incorporate, on its external part, a second metallic socket 13 which, together with the first metallic socket 11, may constitute a capacitive divider, making it possible for (via a metallic tab 14 of the second external socket 13), a probe to be connected to measure the voltage on an associated bar.

The cap 10 may be secured in the cell in a closed position using a flat metallic plate 15 having a pair of oval holes 16 for passing screws or other appropriate fasteners.

The pans 7 themselves, mounted on a pertinent cell (FIG. 6 shows three pans of a same cell) may be linked with a three- or n-phase metallic plate 17 which may act as a screen and diminishes the field through the actual pans 7, preventing a concentration of the field on the rims. A three-phase metallic plate 17 may be embedded in the pans 7, be joined to these in the actual process of their molding, and be secured to the cell by welding around its entire perimeter.

The plate 17 may have a slight elbow 18 in its part embedded in the respective pan 7 that redirects the electric field through the interior of the latter.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of components configured to perform the specified functions. For example, the present invention may employ various elements which may carry out a variety of functions. Furthermore, the present invention could employ any number of conventional techniques for operation.

The particular implementations shown and described herein are illustrative examples of the invention and are not intended to otherwise limit the scope of the invention in any way. For the sake of brevity, conventional elements may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

What is claimed is:

1. An interconnection assembly for electrical switchgear cells, applicable to modular cells that incorporate parts of operation and protection equipment of electrical distribution and transformation stations, comprising an independent connector element housed in each pan, previously coupled to the cells, in correspondence with conductor terminals to be joined and permitting offsetting of misalignments between conductor terminals, the pans permitting an attachable cap when an electrical connection is not required, an electrical isolation of the terminal situated in a bottom of the cap itself being formed, providing a leakproof coupling both mechanically and electrically, of the independent connector element to the conductive terminal of the pan, the independent connector element comprising:

an external mount of elastic material provided internally and partially on the outside with a semiconductor to assure good control of the electric field;

a pair of metallic tubes of a total length less than that of the external elastic mount, arranged internally in the mount and approximately in correspondence with its outermost sectors, in order to leave a central zone of the external and elastic mount free;

a metallic ring and conductor housed directly in an interior of the elastic mount; and a bundle of conductive parts mounted axially in respective passages provided radially in the metallic ring, the conductive ring being in correspondence with the central zone, intercalated between facing ends of the metallic tubes, and fitting tightly between the ring and the mount, the conductive parts being spaced sufficiently from the metallic tubes to permit a degree of swiveling of the bundle formed by those conductive parts in order to offset possible misalignments between the conductive terminals to be connected.

2. The interconnection assembly according to claim 1, wherein the conductive parts comprise:

a central recess in which an area of the recess, its height is less than that offered by holes or passages of the conductive ring and, as a consequence, a free space is left between the conductive parts and the internal surface of the tubes that permits a radial displacement of those conductive parts in the interior of the conductive ring when the connector is coupled over a pertinent conductive terminal and even a swiveling of the conductive parts, in the interior of the mount when the terminals are not in alignment.

3. The interconnection assembly according to claim 1, further comprising:

springs mounted over outermost sectors of the conductive parts on a periphery that press the bundle of conductive parts against the conductive ring which, together with recesses in the conductive parts, impede a displacement in a longitudinal direction and the corresponding extraction of the conductive parts.

4. The interconnection assembly according to claim 1, further comprising:

a cap provided for fitting on the pans when an electrical connection is not necessary, the cap comprising:

an external and insulating support of elastic material, internal and external surfaces comprising semiconductor material to assure a good control of the electric field; and an internal and metallic socket which provides a certain stiffness that assures, in combination with an inherent elasticity of the body of the cap, good impermeability; the metallic socket contributing to the creation of an equipotential space in an interior of the cap, the socket having a hole in its bottom through which passes a small protuberance of flexible, semiconductor material, that comes into contact with the corresponding terminal of the cell, putting the socket and all that is contained therein at the same potential as the terminal and assuring a good contact with the corresponding terminal.

5. The interconnection assembly according to claim 4, wherein the cap further comprises, on its external part:

a second metallic socket which, together with the internal socket, creates a capacitive divider permitting a probe to be connected to measure a voltage on an associated bar via a metallic tab corresponding to the external socket; and a flat metallic plate with holes for securing the plate to a pertinent cell, ensuring a sealed position on the cell.

6. The interconnection assembly according to claim 1, further comprising:

a three-phase metallic plate that joins three pans of a same cell, the plate being embedded in the pans themselves, the metallic plate comprising a slight elbow in order to redirect an electric field through the interior of the actual pan, the three-phase metallic plate being joined to the pans at the time when these pans are in a molding process.

7. The interconnection assembly according to claim 4, further comprising:

a three-phase metallic plate that joins three pans of a same cell, the plate being embedded in the pans themselves, the metallic plate comprising a slight elbow in order to redirect an electric field through the interior of the actual pan, the three-phase metallic plate being joined to the pans at the time when these pans are in a molding process.

* * * * *